United States Patent
Seo et al.

(10) Patent No.: US 8,873,463 B2
(45) Date of Patent: Oct. 28, 2014

(54) METHOD AND APPARATUS FOR TRANSMITTING/RECEIVING DATA IN A RELAY COMMUNICATION SYSTEM

(75) Inventors: Han-Byul Seo, Gyeonggi-Do (KR); Byoung-Hoon Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 13/202,043

(22) PCT Filed: Feb. 19, 2010

(86) PCT No.: PCT/KR2010/001025
§ 371 (c)(1),
(2), (4) Date: Aug. 17, 2011

(87) PCT Pub. No.: WO2010/095874
PCT Pub. Date: Aug. 26, 2010

(65) Prior Publication Data
US 2011/0317616 A1    Dec. 29, 2011

Related U.S. Application Data

(60) Provisional application No. 61/153,967, filed on Feb. 19, 2009, provisional application No. 61/155,159, filed on Feb. 25, 2009.

(51) Int. Cl.
| | |
|---|---|
| H04W 4/00 | (2009.01) |
| H04J 3/00 | (2006.01) |
| H04L 12/43 | (2006.01) |
| H04J 3/16 | (2006.01) |
| H04B 7/155 | (2006.01) |
| H04B 7/26 | (2006.01) |
| H04W 72/12 | (2009.01) |
| H04L 5/14 | (2006.01) |
| H04W 84/04 | (2009.01) |

(52) U.S. Cl.
CPC .......... *H04B 7/15557* (2013.01); *H04B 7/2656* (2013.01); *H04B 7/2606* (2013.01); *H04W 84/047* (2013.01); *H04W 72/1252* (2013.01); *H04L 5/143* (2013.01)
USPC ............ 370/328; 370/345; 370/458; 370/468

(58) Field of Classification Search
None
See application file for complete search history.

(56) References Cited

U.S. PATENT DOCUMENTS

| 8,072,911 B2 * | 12/2011 | Astely et al. ................. 370/280 |
| 2008/0181167 A1 | 7/2008 | Sydir et al. |
| 2009/0046800 A1 * | 2/2009 | Xu et al. ...................... 375/267 |
| 2010/0080139 A1 * | 4/2010 | Palanki et al. ............... 370/252 |
| 2011/0243107 A1 * | 10/2011 | Koivisto et al. ............. 370/336 |

OTHER PUBLICATIONS

U.S. Appl. No. 61/101,571, Palanki et al., Sep. 30, 2008, Fig. 5 and [0041].*
3GPP TSG RAN WG1 Meeting #56—R1-090665 "UL subframe stealing for in-band relaying in TDD mode," LG Electronics, pp. 1-6, dated Feb. 9-13, 2009.

\* cited by examiner

*Primary Examiner* — Ashley Shivers
(74) *Attorney, Agent, or Firm* — Birch, Stewart, Kolasch & Birch, LLP

(57) ABSTRACT

A method and device for transmitting or transceiving data in a wireless system. The method includes: transmitting or transceiving a downlink signal by using a special subframe. The special subframe includes a first transmission period and a second transmission period. The first transmission period is set to transmit the downlink signal to the relay node or the terminal. The second transmission period is set to transmit the downlink signal to the relay node and is set to not decode a reference signal by the terminal.

15 Claims, 16 Drawing Sheets

METHOD AND APPARATUS FOR TRANSMITTING/RECEIVING DATA IN A RELAY COMMUNICATION SYSTEM

This application is the National Phase of PCT/KR2010/001025 filed on Feb. 19, 2010 which claims priority under 34 U.S.C. 119(e) to U.S. Provisional Application Nos. 61/153,967 filed on Feb. 19, 2009 and 61/155,159 filed on Feb. 25, 2009 all of which are hereby expressly incorporated by reference into the present application.

TECHNICAL FIELD

The present invention relates to a method and apparatus for transmitting/receiving data in a communication system, and more particularly, to a method and apparatus for transmitting/receiving data in a relay communication system.

BACKGROUND ART

According to the recent trend, a radio communication system has an increased service frequency band, and cells having decreased radiuses for high speed data communications and increased telephone traffic. This may cause many problems when applying the existing centralized cellular radio network method as it is. More concretely, a configuration of a radio link has a degraded flexibility due to a fixed location of a base station. This may cause a difficulty in providing efficient communication services in a radio environment where traffic distributions or requested telephone traffic are severely changed.

In order to solve these problems, the next generation radio communication system referred to as LTE-Advanced (Long Term Evolution Advanced) system or E-UTRA (Evolved Universal Terrestrial Radio Access) considers a Multi-Hop relay system. This multi-hop relay system has the following advantages. Firstly, a cell service area may be increased by covering partial shadow areas occurring inside a cell area, and a system capacity may be increased. Furthermore, an initial situation requiring less service is implemented by using a relay. This may reduce the initial installation costs.

In the relay system, a communication channel between a base station and a terminal may be implemented through a direct connection therebetween, or may be implemented in the form of a relay node (RN). Here, the communication channel formed between the base station and the RN is called 'backhaul' link. An in-band backhaul method indicates a method for dynamically sharing frequency resources between a backhaul communication and a terminal communication, and an out-band backhaul method indicates a method for separately using frequency resources between a backhaul communication and a terminal communication.

Especially, the in-band backhaul method is preferred since additional frequency resources need not be allocated to a backhaul communication. However, the in-band backhaul method has the following problems. When a relay node transmits data to a terminal and at the same time receives data from a base station, reception interference may occur due to transmission in the same frequency band. Furthermore, in order for the relay node to support transmission and reception at the same time, required is an operation of high complexity to increase installation costs. In case of a transmission from a terminal to a relay node, similar problems occur. In the next-generation wireless communication system, it is important to maintain backward compatibility with the conventional system at a maximum level. Therefore, in the in-band backhaul method, reception interference has to be minimized, and state changes in the conventional system or the conventional terminal have to be minimized.

DISCLOSURE OF THE INVENTION

Therefore, an object of the present invention is to provide a method and apparatus for transmitting/receiving data capable of minimizing interference occurring when transmitting a backhaul signal in a relay communication system, and capable of maintaining backward compatibility with the conventional communication systems.

To achieve these and other advantages and in accordance with the purpose of the present invention, as embodied and broadly described herein, there is provided a method for transmitting/receiving data according to one embodiment, the method comprising the steps of: setting a data frame including a downlink subframe for transmitting a downlink (DL) signal, an uplink subframe for transmitting an uplink signal, and a special subframe placed between the downlink subframe and the uplink subframe; and transmitting/receiving data to/from a relay node or a terminal via the data frame set in the previous step. The special subframe may include a first transmission period and a second transmission period. The DL signal may be transmitted to the relay node or the terminal via the first transmission period, and the DL signal may be transmitted to the relay node via the second transmission period. And, the terminal may not perform a reference signal decoding process during the second transmission period.

The special subframe may further include a guard period between the first transmission period and the second transmission period. During the guard period, a garbage signal may be transmitted to the relay node or the terminal.

The method may further comprise transmitting a DL signal to the relay node via the second transmission period, and then entering a UL signal reception mode from the relay node or the terminal.

According to another embodiment, there is provided a method for transmitting/receiving data, the method comprising the steps of: setting a data frame including a downlink subframe for transmitting a downlink signal, an uplink subframe for transmitting an uplink signal, and a special subframe placed between the downlink subframe and the uplink subframe; and transmitting/receiving data to/from a base station or a terminal via the data frame set in the previous step. The special subframe may include a first transmission period and a second transmission period. The DL signal may be transmitted to the terminal via the first transmission period, and the DL signal may be transmitted from the base station via the second transmission period. And, the terminal may not perform a reference signal decoding process during the second transmission period.

The special subframe may further include a guard period between the first transmission period and the second transmission period. During the guard period, a mode conversion from a transmission mode to a reception mode may be executed.

The method may further comprise receiving a DL signal from the base station via the second transmission period, and then entering a UL signal reception mode from the terminal.

According to still another embodiment, there is provided a method for transmitting/receiving data, the method comprising the steps of: setting a data frame including a downlink subframe for transmitting a downlink signal, an uplink subframe for transmitting an uplink signal, and a special subframe placed between the downlink subframe and the uplink subframe; and transmitting/receiving data to/from a relay node or a terminal via the data frame set in the previous step. A DL signal to the relay node and a DL signal to the terminal may be transmitted through multiplexing, via at least one transmission period of the special subframe, and the terminal may not perform a reference signal decoding process during said at least one transmission period.

The method may further comprise transmitting a DL signal to the relay node and a DL signal to the terminal through multiplexing, and then entering a UL signal reception mode from the relay node or the terminal.

According to still another embodiment, there is provided a method for transmitting/receiving data, the method comprising the steps of: setting a data frame including a downlink subframe for transmitting a downlink signal, an uplink subframe for transmitting an uplink signal, and a special subframe placed between the downlink subframe and the uplink subframe; and transmitting/receiving data to/from a base station or a first terminal via the data frame set in the previous step. The special subframe may include a first transmission period and a second transmission period. The DL signal may be transmitted to the first terminal via the first transmission period. The DL signal from the base station, and the DL signal to a second terminal from the base station may be received through multiplexing, via the second transmission period. And, the first and second terminals may not perform a reference signal decoding process during at least one transmission period of the special subframe.

The method may further comprise transmitting the DL signal from the base station, and the DL signal to the second terminal from the base station may be transmitted through multiplexing, and then entering a UL signal reception mode from the first terminal.

According to still another embodiment, there is provided a method for transmitting/receiving data, the method comprising the steps of: setting a data frame including a downlink subframe for transmitting a downlink signal, an uplink subframe for transmitting an uplink signal, and a special subframe placed between the downlink subframe and the uplink subframe; transmitting/receiving data, by a base station, to/from a relay node or a first terminal via the data frame set in the previous step; and transmitting/receiving data, by the relay node, to/from the base station or a second terminal via the data frame set in the previous step. The special subframe may include a first transmission period and a second transmission period. The DL signal may be transmitted, from the base station, to the relay node, the first terminal or the second terminal via the first transmission period. The DL signal from the base station to the relay node may be transmitted via the second transmission period. And, the first and second terminals may not perform a reference signal decoding process during the second transmission period.

The first transmission and the second transmission period from a perspective (viewpoint) of the base station may not match the first transmission and the second transmission period from a perspective of the relay node.

The first transmission period may correspond to a Downlink Pilot Time Slot from a perspective of the first and second terminals, and the second transmission period may correspond to at least part of a guard period from a perspective of the first and second terminals.

To achieve these and other advantages and in accordance with the purpose of the present invention, as embodied and broadly described herein, there is also provided an apparatus for transmitting/receiving data according to one embodiment, the apparatus comprising: a controller configured to set a data frame including a downlink subframe for transmitting a downlink (DL) signal, an uplink subframe for transmitting an uplink signal, and a special subframe placed between the downlink subframe and the uplink subframe; and a transceiver configured to transmit/receive data to/from a relay node or a terminal via the data frame set in the previous step. The special subframe may include a first transmission period and a second transmission period. The DL signal may be transmitted to the relay node or the terminal via the first transmission period, and the DL signal may be transmitted to the relay node via the second transmission period. And, the terminal may not perform a reference signal decoding process during the second transmission period.

According to another embodiment, there is provided an apparatus for transmitting/receiving data, the apparatus comprising: a controller configured to set a data frame including a downlink subframe for transmitting a downlink signal, an uplink subframe for receiving an uplink signal, and a special subframe placed between the downlink subframe and the uplink subframe; and a transceiver configured to transmit/receive data to/from a base station or a terminal via the data frame set in the previous step. The special subframe may include a first transmission period and a second transmission period. The DL signal may be transmitted to the terminal via the first transmission period, and the DL signal may be received from the base station via the second transmission period. And, the terminal may not perform a reference signal decoding process during the second transmission period.

In the method and apparatus for transmitting data in a relay communication system, the special subframe positioned at a switching point between a DL mode and a UL mode in a TDD mode may be used to transmit a backhaul signal. This may minimize interference which may occur in a backhaul communication between the base station and the relay node.

Furthermore, the backhaul signal transmission period in the special subframe may have various configurations. This may adjust a transmission volume of the backhaul communication between the base station and the relay node, by adapting to a dynamic state change of a communication between the base station and the terminal.

Besides, a reference signal may not be measured or decoded by allowing the terminal to recognize the backhaul signal transmission period as a guard period. This may allow the backward compatibility between the present invention and conventional wireless communication systems and conventional terminals to be maintained at a maximum level.

MODES FOR CARRYING OUT THE PREFERRED EMBODIMENTS

Figure 1:
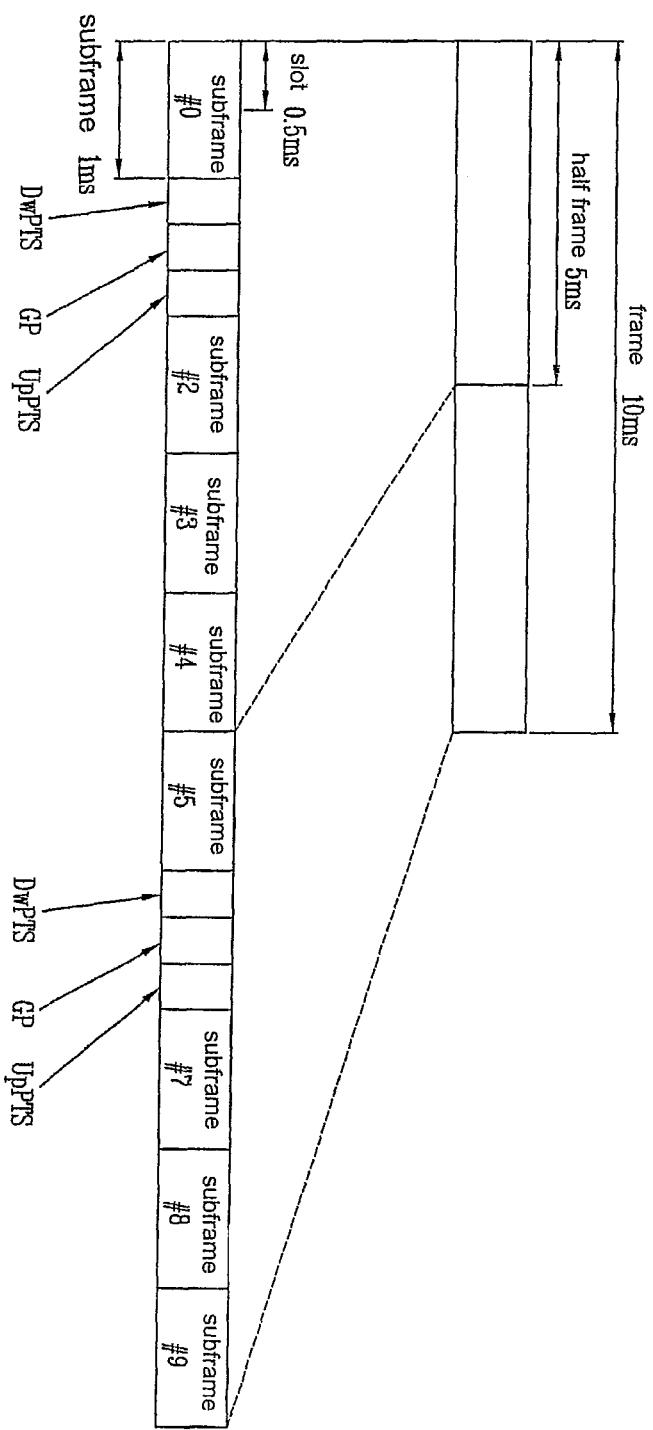
FIG. 1 is view illustrating a TDD frame structure of a 3GPP LTE system.

Hereinafter, preferred embodiments of the present invention will be explained in more details with reference to the attached drawings. Wherever possible, the same reference numerals will be used through the drawings to refer to the same or similar parts, and the same descriptions thereof are omitted. However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

First of all, will be explained terms required to disclose the preferred embodiments of the present invention.

Communication System

A communication system of the present invention is a multiple access system for providing communications with multiple users by sharing radio resources such as frequency bands. A multiple access technique applied to the communication system of the present invention may include TDMA (Time Division Multiple Access), FDMA (Frequency Division Multiple Access), CDMA (Code Division Multiple Access), SC-FDMA (Single carrier Frequency Division Multiple Access), or well-known other modulation techniques. A multiple access scheme for downlink transmission may be different from a multiple access scheme for uplink transmission. For instance, an OFDMA scheme may be used for downlink transmission, whereas an SC-FDMA scheme may be used for uplink transmission.

The communication system of the present invention is a system for providing various communication services such as voice and packet data. For instance, the communication system may be a 3GPP (3rd Generation Partnership Project) LTE(Long Term Evolution) system, a 3GPP LTE-Advanced system, etc. The following communication system is not limited to a specific system, but will be explained with taking a 3GPP LTE system as an example for clarity.

Terminal

A terminal of the present invention may be referred to as a Subscriber Station (SS), a User Equipment (UE), a Mobile Equipment (ME), a Mobile Station (MS), etc., and includes a portable device having a communication function such as a portable phone, a PDA, a smart phone and a notebook, or an unportable device such as a PC and a vehicle-mounted device.

Base Station

A base station of the present invention indicates a fixed point communicated with a terminal, which may be referred to as an eNB (evolved-NodeB), an NB (NodeB), a BS (base station), a BTS (base transceiver system), an AP (access point), etc. One base station may provide a communication service to one or more cells, and an interface for transmission of a user traffic or a control traffic may be used between base stations.

Relay Node

A relay node of the present invention may be referred to as a relay, an RS (Relay Station), etc., and is installed between a base station and a terminal to relay a transmitted or received signal. This relay node covers partial shadow areas occurring inside a cell area, extends a cell service area, and increases a system capacity. The relay node may be implemented as a multi-hop for effectively relaying data traffic occurring between the base station and the terminal. Alternatively, the relay node may be fixed to one position or may have mobility.

Downlink, Uplink

A downlink indicates a communication channel from the base station to the terminal, and an uplink indicates a communication channel from the terminal to the base station. In the DL, a transmitting end may be part of the base station, and a receiving end may be part of the terminal. In the UL, a transmitting end may be part of the terminal, and a receiving end may be part of the base station.

Hereinafter, with reference to FIGS. 1 to 16, a method and apparatus for transmitting/receiving data in a relay communication system will be explained in more details, the method and apparatus capable of minimizing interference which may occur in a backhaul communication and capable of maintaining the backward compatibility at a maximum level.

FIG. 1 is view illustrating a TDD frame structure of a 3GPP LTE system.

Referring to FIG. 1, a frame of a 3GPP LTE system consists of 10 subframes (subframe #0~subframe #9). These subframes may consist of 7 OFDM (orthogonal frequency division multiple) symbols in a normal cyclic prefix (CP), and may consist of 6 OFDM symbols in an extended cyclic prefix.

A special subframe is disposed at a switching point between a downlink transmission and an uplink transmission. Especially, switching to a downlink transmission from an uplink transmission corresponds to a mere intra-cell switching. On the other hand, switching to an uplink transmission from a downlink transmission requires the special subframe at a switching point to an uplink transmission from a downlink transmission, since a downlink transmission of high power from a base station may cause interference on an uplink reception of a neighboring base station.

The special subframe consists of DwPTS (downlink pilot time slot), GP (guard period) and UpPTS (uplink pilot time slot). The special subframe may consist of 1 ms or less than. The GP is a period for timing advance to cover a time duration for switching of a hardware, and to compensate for propagation delay between a base station and a terminal. Especially, this GP is used as a guard period for removing interference occurring at an uplink due to multiple-path delay of a downlink signal. The DwPTS is a downlink transmission period of control information and data, which may be regarded as a general downlink subframe. Especially, the DwPTS is used to search for an initial cell and to execute synchronization or channel estimation. The UpPTS is an uplink transmission period. Especially, this UpPTS is used to transmit an SRS (sounding reference signal) for channel estimation at a base station, and to transmit a random access channel (RACH) for synchronization of a terminal's uplink transmission.

The following table 1 illustrates a configurable frame structure according to arrangements of an uplink subframe and a downlink subframe in a TDD mode of a 3GPP LTE system. In the table 1, 'D' indicates a downlink subframe, 'U' indicates an uplink subframe and 'S' indicates a special subframe.

TABLE 1

| | | Uplink-downlink | | | | | | | | | |
|---|---|---|---|---|---|---|---|---|---|---|---|
| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in the table 1, there are 7 configurable arrangements of a TDD subframe, configurations 0~2 and 6 are converted to an uplink from a downlink with a period of 5 ms, and configurations 3~5 are converted to an uplink from a downlink with a period of 10 ms, And, there is a special subframe at a switching point to an uplink from a downlink.

The following table 2 illustrates a configurable structure of a special subframe in a 3GPP LTE system. As aforementioned, the special subframe consists of DwPTS, GP and UpPTS. In the table 2, '$T_s$' indicates a basic time unit or sampling time, and is defined as $1/(15000*2048)$ (seconds). Nine combinations may be implemented in case of a normal cyclic prefix (CP), and 7 combinations may be implemented in case of an extended cyclic prefix.

TABLE 2

| Special subframe configuration | Normal cyclic prefix | | | Extended cyclic prefix | | |
|---|---|---|---|---|---|---|
| | DwPTS | GP | UpPTS | DwPTS | GP | UpPTS |
| 0 | $6592 \cdot T_s$ | $21936 \cdot T_s$ | $2192 \cdot T_s$ | $7680 \cdot T_s$ | $20480 \cdot T_s$ | $2560 \cdot T_s$ |
| 1 | $19760 \cdot T_s$ | $8768 \cdot T_s$ | | $20480 \cdot T_s$ | $7680 \cdot T_s$ | |
| 2 | $21952 \cdot T_s$ | $6576 \cdot T_s$ | | $23040 \cdot T_s$ | $5120 \cdot T_s$ | |
| 3 | $24144 \cdot T_s$ | $4384 \cdot T_s$ | | $25600 \cdot T_s$ | $2560 \cdot T_s$ | |
| 4 | $26336 \cdot T_s$ | $2192 \cdot T_s$ | | $7680 \cdot T_s$ | $17920 \cdot T_s$ | $5120 \cdot T_s$ |
| 5 | $6592 \cdot T_s$ | $19744 \cdot T_s$ | $4384 \cdot T_s$ | $20480 \cdot T_s$ | $5120 \cdot T_s$ | |
| 6 | $19760 \cdot T_s$ | $6576 \cdot T_s$ | | $23040 \cdot T_s$ | $2560 \cdot T_s$ | |
| 7 | $21952 \cdot T_s$ | $4384 \cdot T_s$ | | — | — | — |
| 8 | $24144 \cdot T_s$ | $2192 \cdot T_s$ | | — | — | — |

Figure 2:
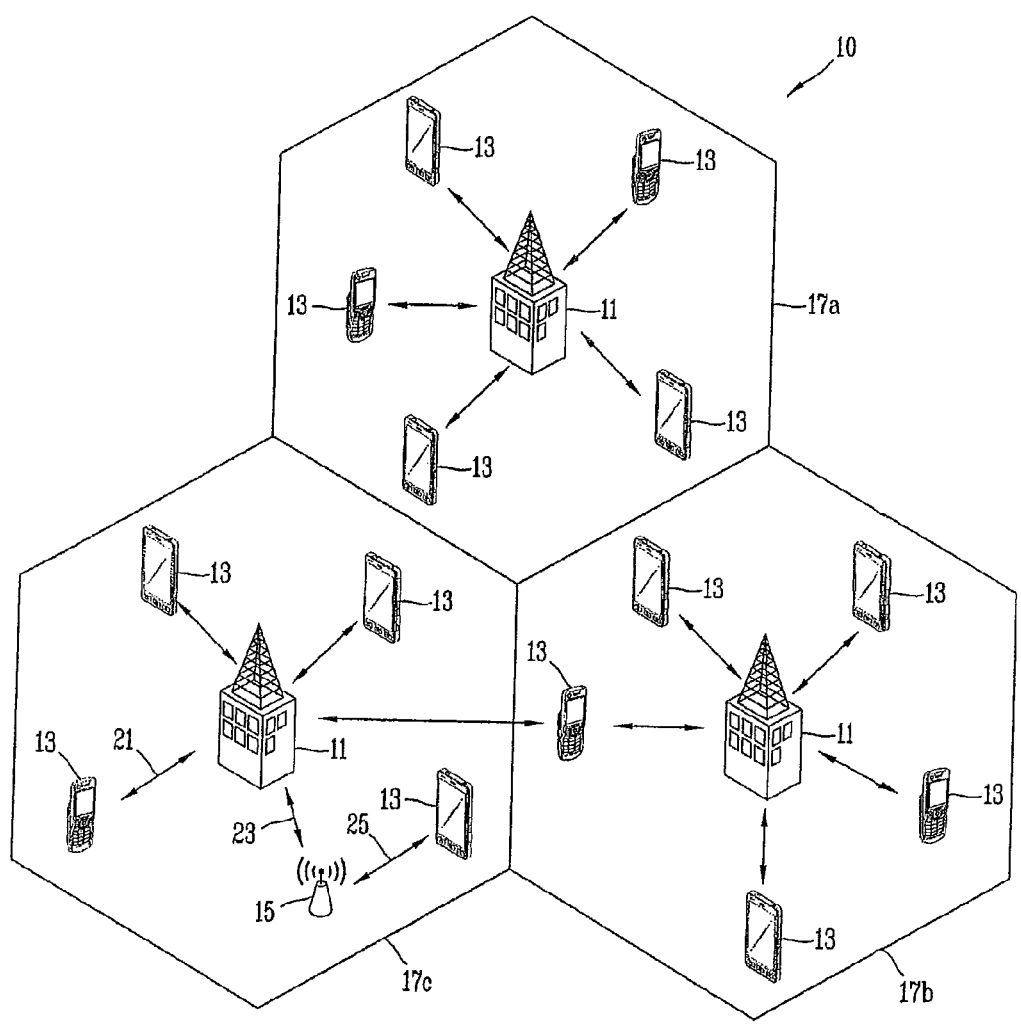
FIG. 2 is a conceptual diagram to explain a relay wireless communication system to which the present invention may be applied.

FIG. 2 is a conceptual diagram to explain a relay wireless communication system to which the present invention may be applied.

As shown in FIG. 2, a radio communication system 10 includes one or more base stations 11. Each base station 11 may provide a communication service with respect to one or more cells 17a, 17b and 17c, and each cell 17a, 17b and 17c may consist of a plurality of sectors (not shown). A terminal (UE) 13 may communicate with one or more base stations 11.

The base station 11 may form a communication channel with the terminal 13 via a link 21, or via links 23 and 25 through a relay node 15. Here, a channel 23 formed between the base station 11 and the relay node 17, especially, a downlink channel is referred to as a backhaul link. For instance, in a 3GPP LTE system, the backhaul link 23 may include R-PDSCH (Relay Physical Downlink Shared Channel) through which data is transferred to the relay node 15 from the base station 11, and R-PDCCH (Relay Physical Downlink Control Channel) through which control information is transferred to the relay node 15 from the base station 11.

Generally, it is assumed that the relay node 15 cannot simultaneous execute reception and transmission in the same frequency band. The reason is as follows. If the relay node 15 simultaneously supports reception and transmission, an operation of high complexity is required to increase the installation costs.

Accordingly, the relay node 15 cannot transmit a downlink signal to relay UEs 14 connected thereto while receiving a signal of the backhaul link 23 from the base station 11. If the downlink signal 25 to be transmitted to the relay UEs 14 from the relay node 15 is blanked, the relay UEs 14 cannot normally receive a pilot signal or a reference signal included in the downlink signal 25.

The pilot signal or the reference signal is a preset transmission signal notified to a transmission side and a reception side, which is used to check a distorted degree of a transmission signal when the transmission signal is transmitted to the reception side from the transmission side through a transmission channel. Generally, the reference signal is used to acquire channel information and/or to execute data demodulation. This reference signal includes a Cell-specific reference signal (common reference signal; CRS) shared by all terminals inside a cell, and a Dedicated reference signal (DRS) for a specific terminal.

The CRS is used to acquire information on a channel status, to measure a handover, etc. The terminals 13 and 14 may measure the CRS, and inform the base station 11 or the relay node 15 of feedback information such as CQI (Channel Quality Information), PMI (Precoding Matrix Indicator) and RI (Rank Indicator). And, the base station 11 or the relay node 15 may execute a scheduling of a downlink frequency region based on the feedback information received from the terminals 13 and 14.

Generally, the terminals 13 and 14 expect reference signals in subframes of all the downlinks 25. Accordingly, the relay node 15 which is to receive a signal of the backhaul link 23 from the base station 11 should inform the relay UEs 14 connected thereto that a signal of the downlink 25 is to be blanked. If the relay node 15 receives a backhaul signal without this notification, the relay UEs 14 expect reference signals in subframes of all the downlinks 25. This may cause a channel measurement at the terminals to be severely deteriorated.

In order to solve the aforementioned problems, may be considered a method for implementing a subframe to receive a backhaul signal by the relay node 15 from the base station 11, as an MBSFN (multicast broadcast single frequency network) subframe. The conventional terminals 13 and 14 do not measure a reference signal with respect to the MBSFN subframe. Accordingly, the MBSFN subframe is set as a reception subframe. This may allow the relay node 15 to stop transmitting data to the relay UEs 14 and to receive a backhaul signal, without causing measurement obstacles of the conventional relay UEs 14. This method using the MBSFN subframe may be considered as a partial blanking method. A first part of the MBSFN subframe may be used to transmit control information to the relay UEs 14 connected to the relay node 15, and the rest part thereof may be used to receive a backhaul signal. A backhaul signal from the relay node 15 to the base station 11 may be transmitted with using a UL subframe.

However, the method using an MBSFN subframe cannot be applied to set some arrangements of DL and UL subframes. For instance, in the configuration 0 of Table 1, there is no subframe to be set as an MBSFN subframe. The reason is as follows. Since subframes #0, #1, #5 and #6 transmit important signals including a synchronization signal such as PSS (primary synchronization signal) and SSS (second synchronization signal), a paging message, etc., they cannot be set as MBSFN subframes. Furthermore, the method using an MBSFN subframe cannot be applied to the configuration 5. The reason is because there is no UL subframe allocable to a link from the terminal to the relay node when the only UL subframe is used as a backhaul link from the relay node to the base station.

In order to solve the aforementioned problems and limitations, the method for transmitting/receiving data according to one embodiment of the present invention proposes a method for using a special subframe when transmitting a backhaul signal. The terminals 13 and 14 expect a CRS at DwPTS of a special subframe, but do not perform a CRS measurement or a CRS decoding at the rest part (GP, UpPTS). This may allow the base station 11 to transmit backhaul data to the relay node 15 with including in the GP and the UpPTS. In the method for transmitting/receiving data according to one embodiment of the present invention, an MBSFN subframe needs not be set (established) since the relay node 15 can receive a backhaul signal at the GP and the UpPTS. Furthermore, in the method for transmitting/receiving data according to one embodiment of the present invention, the relay node 15 may transmit a backhaul signal to the base station 11 through a special subframe. This is especially effective in the configuration 4 or configuration 5 where one frame includes only one or two UL subframes.

The base station and the relay node may use a mutual connection interface of a level corresponding to base station versus base station during an initial setting process. For instance, the base station and the relay node may be connected to each other according to an X2 interface. Alternatively, the base station and the relay node may use a mutual connection interface of a level corresponding to base station versus terminal during an initial setting process. For instance, the base station may recognize the relay node as the terminal, and may be connected to the relay node through the same or similar procedures as/to the procedures used for connection with the terminal.

In communications among the base station, the relay node and the terminal, an additional time period is allocated between a DL transmission period and a UL transmission period. Here, the base station may control the allocation of the time period by a center-concentrated scheme, or according to agreements between the base station and the relay node by a distribution-type scheme.

For the allocation of the time period, setting information of a special subframe may be shared among the base station, the relay node and the terminal, and configuration information of the special subframe for a backhaul communication may be shared between the base station and the relay node, during an initial setting process when the base station, the relay node and the terminal are connected to one another. For instance, when the relay node corresponds to a Type 1 relay node in a 3GPP LTE system, the relay node operates like the base station with having a unique cell ID. In this case, configuration information of the special subframe for a backhaul communication may be shared by exchanging a message having a level of L3 between the base station and the relay node.

The time period may be divided into at least two shorter transmission periods. For instance, the time period may be divided into a first transmission period and a second transmission period. Generally, the first transmission period and the second transmission period do not overlap each other on a time axis. However, part of the first transmission period and part of the second transmission period may overlap each other on a time axis. Hereinafter, it is assumed that the aforementioned special subframe is an example of the time period, and the DwPTS, GP and UpPTS correspond to examples having a shorter transmission period than the time period. However, the special subframe, the DwPTS, the GP and the UpPTS correspond to mere examples to explain one embodiment of the present invention, and the present invention is not limited to them.

Figure 3:
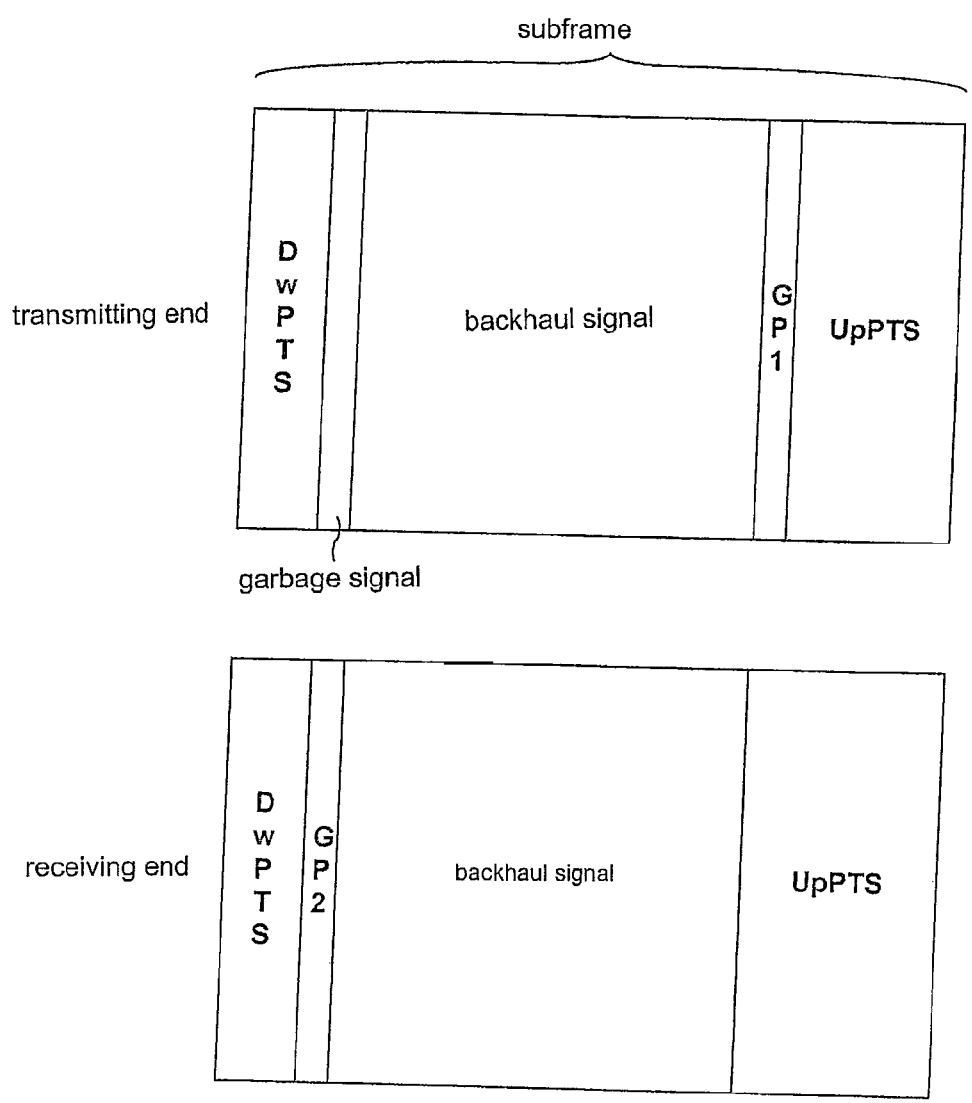
FIG. 3 is a view illustrating a signal structure of a special subframe used to transmit/receive data in a relay communication system according to one embodiment of the present invention.

FIG. 3 is a view illustrating a signal structure of a special subframe used to transmit/receive data in a relay communication system according to one embodiment of the present invention.

First of all, a transmitting end transmits a DL signal to the terminals at the DwPTS. Here, a receiving end may transmit a DL signal to the terminals at the DwPTS. In a link from the base station to the relay node, the base station corresponds to the transmitting end. And, in a link from the relay node to the base station, the relay node corresponds to the transmitting end.

While the receiving end performs a mode conversion between a transmission mode and a reception mode during GP2, the transmitting end transmits a garbage signal. Here, the garbage signal may indicate an arbitrary meaningless signal transmitted from the transmitting end, or an arbitrary signal detected when the transmitting end is in a standby state without transmitting a special signal in a state that power of a transmitter has not turned OFF. The time when the transmitting end transmits a garbage signal may be recognized as a guard period in the aspect of the receiving end. In a link from the base station to the relay node, the relay node corresponds to the receiving end. And, in a link from the relay node to the base station, the base station corresponds to the receiving end.

Then, the transmitting end transmits a backhaul signal to the receiving end until it reaches GP1. The GP1 indicates a guard period where the transmitting end and the receiving end move to a reception mode to prepare for reception of a UL signal from the terminals. Then, the transmitting end receives a UL signal from the terminals at the UpPTS.

According to the aforementioned embodiment, it may be identified that the garbage signal period, the backhaul signal period and the GP1 correspond to GP in a configuration of the special subframe.

Figure 4:
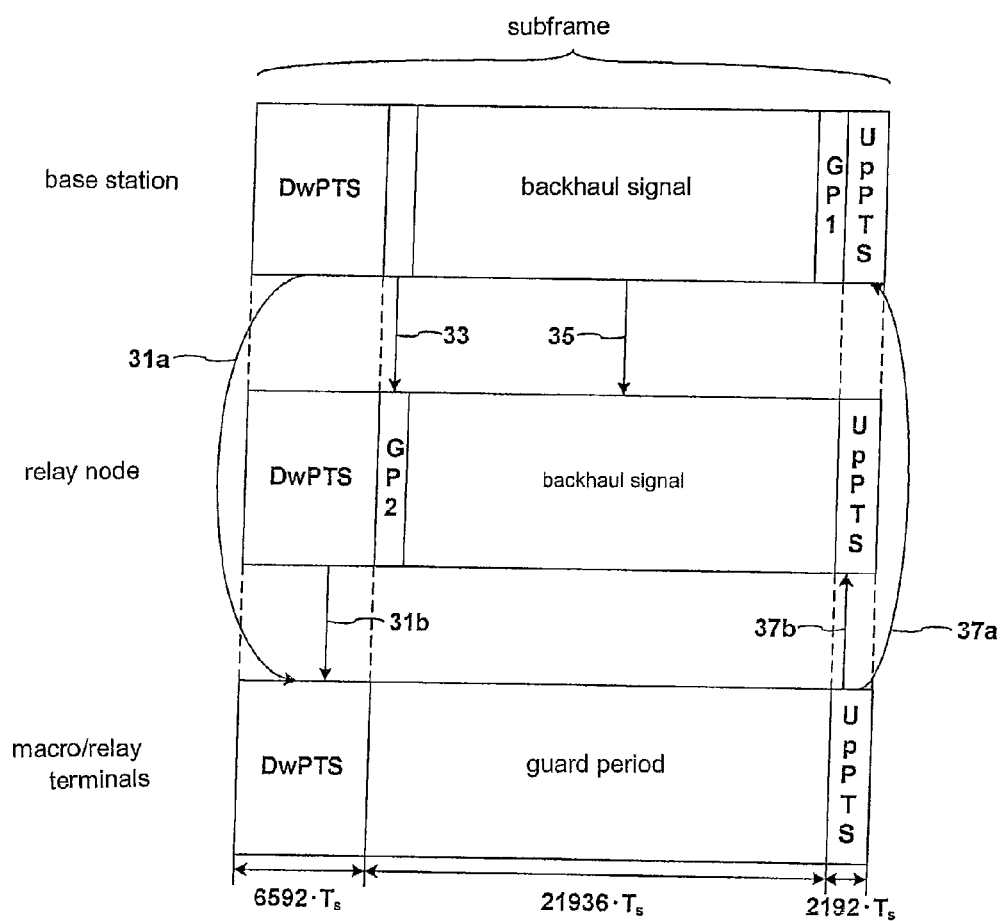
FIGS. 4 and 5 are exemplary views illustrating reciprocal relations among a base station, a relay node and a terminal in a method for transmitting/receiving data in a relay communication system according to one embodiment of the present invention.
Figure 5:
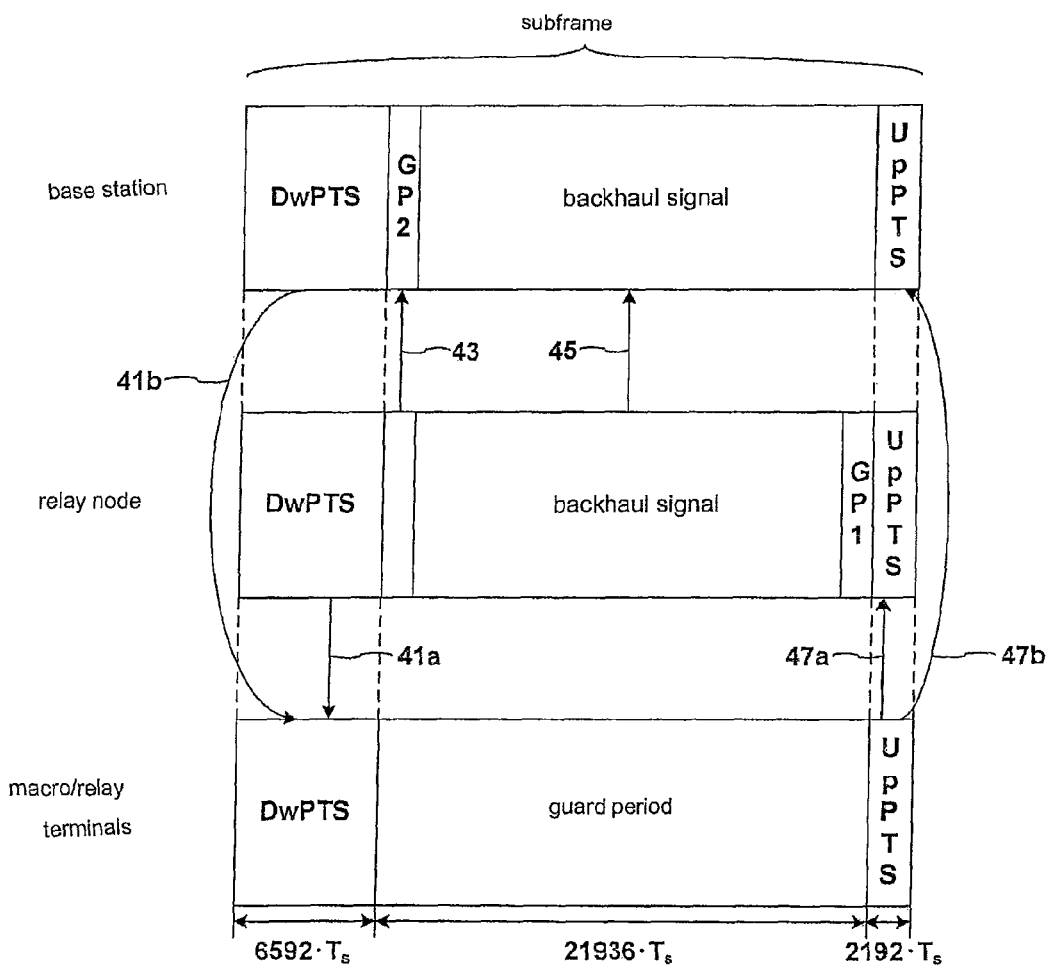

FIGS. 4 and 5 are exemplary views illustrating reciprocal relations among the base station, the relay node and the terminal in a method for transmitting/receiving data in a relay communication system according to one embodiment of the present invention.

Referring to FIG. 4, the base station corresponds to the transmitting end, and the relay node corresponds to the receiving end. In FIG. 4, used configurations of a special subframe for a backhaul communication are configuration 0 among the configurations illustrated in Table 2, and a configuration illustrated in FIG. 3.

During an initial setting process when the base station, the relay node and the terminal are connected to one another, the special subframe is set to have configuration 0 among the base station, the relay node and the terminal. And, the special subframe is set to have a configuration for a backhaul communication illustrated in FIG. 3 between the base station and the relay node.

The base station transmits a DL signal to macro UEs directly connected thereto via a link at the DwPTS (31*a*), and the relay node transmits a DL signal to relay UEs connected to the base station therethrough at the DwPTS (31*b*). Although not shown in FIG. 4, the base station and the relay node may transmit a DL signal with respect to the same data or the same control signal. If the relay UEs can receive not only a DL signal from the relay node but also a DL signal from the base station, the relay UEs may acquire a signal gain due to source diversity or spatial multiplexing.

While the relay node performs a mode conversion to a reception mode at the GP2, the base station transmits a garbage signal (33). Once the relay node has completely performed a mode conversion to a reception mode, a backhaul signal is transmitted to the relay node from the base station (35). From a perspective of the terminals, the periods 33 and 35 where backhaul preparation and backhaul signal transmission are performed between the base station and the relay node are recognized as GPs where a signal transmission is not performed. Therefore, a CRS measurement or a CRS decoding is not performed with respect to the periods 33 and 35.

After the backhaul signal transmission has been performed, the base station performs a mode conversion to a reception mode at the GP1, and receives a UL signal transmitted from the macro UEs at the UpPTS (37*a*). The relay node receives a UL signal transmitted from the relay UEs at the UpPTS (37*b*).

Referring to FIG. 5, the relay node corresponds to the transmitting end, and the relay node corresponds to the receiving end. In FIG. 5, used configurations of a special subframe for a backhaul communication are configuration 0 among the configurations illustrated in Table 2, and a configuration illustrated in FIG. 3.

During an initial setting process when the base station, the relay node and the terminal are connected to one another, the special subframe is set to have a configuration 0 among the base station, the relay node and the terminal. And, the special subframe is set to have a configuration for a backhaul communication illustrated in FIG. 3 between the base station and the relay node.

The relay node transmits a DL signal to relay UEs at the DwPTS (41*a*), and the base station transmits a DL signal to macro UEs at the DwPTS (41*b*). Although not shown in FIG. 5, the base station and the relay node may transmit a DL signal with respect to the same data or the same control signal. If the relay UEs can receive not only a DL signal from the relay node but also a DL signal from the base station, the relay UEs may acquire a signal gain due to source diversity or spatial multiplexing.

While the base station performs a mode conversion to a reception mode at the GP2, the relay node transmits a garbage signal (43). Once the base station has completely performed a mode conversion to a reception mode, a backhaul signal is transmitted to the base station from the relay node (45). From a perspective of the terminals, the periods 43 and 45 where backhaul preparation and backhaul signal transmission are performed between the relay node and the base station are recognized as GPs where a signal transmission is not performed. Therefore, a CRS measurement or a CRS decoding is not performed with respect to the periods 43 and 45.

After the backhaul signal transmission has been performed, the relay node performs a mode conversion to a reception mode at the GP1, and receives a UL signal transmitted from the relay UEs at the UpPTS (47*a*). The base station receives a UL signal transmitted from the macro UEs at the UpPTS (47*b*).

Figure 6:
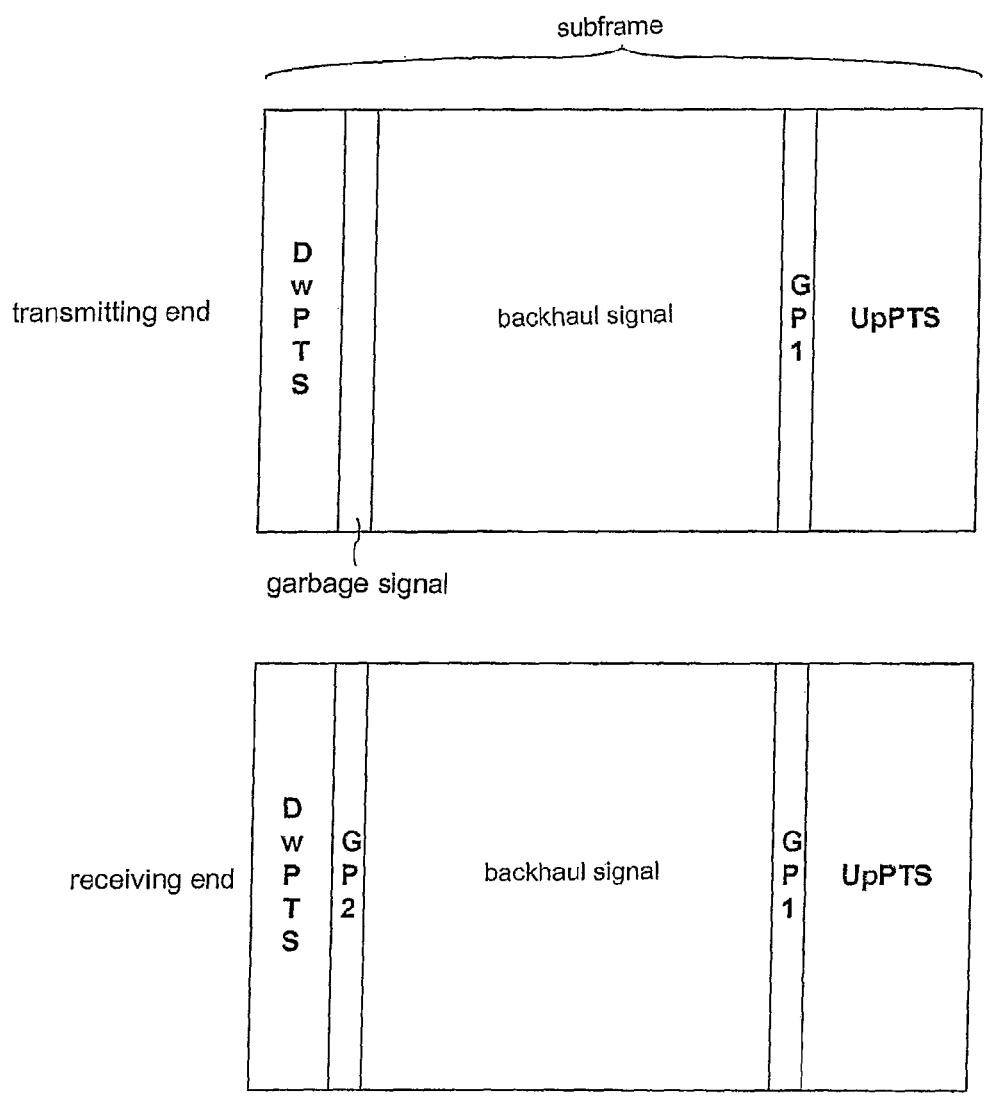
FIG. 6 is a view illustrating a signal structure of a special subframe used to transmit/receive data in a relay communication system according to another embodiment of the present invention.

FIG. 6 is a view illustrating a signal structure of a special subframe used to transmit/receive data in a relay communication system according to another embodiment of the present invention.

One embodiment of FIG. 3 may be compared with another embodiment of FIG. 6 as follows. In one embodiment of FIG. 3, while the transmitting end prepares for reception of a UL signal from the terminals at the GP1, the receiving end receives a UL signal from the terminals. On the other hand, in the second embodiment of FIG. 6, the receiving end prepares for reception of a UL signal from the terminals at the GP1 like the transmitting end.

More concretely, in one embodiment of FIG. 3, upon receipt of a backhaul signal, the receiving end receives a UL signal from the terminals. On the other hand, in the second embodiment of FIG. 6, the receiving end receives a backhaul signal, and then receives a UL signal from the terminals via a guard period of a predetermined time. Preferably, whether to receive a UL signal immediately or after a predetermined time may be determined by the receiving end with consideration of a communication statue, environments, etc.

Figure 7:
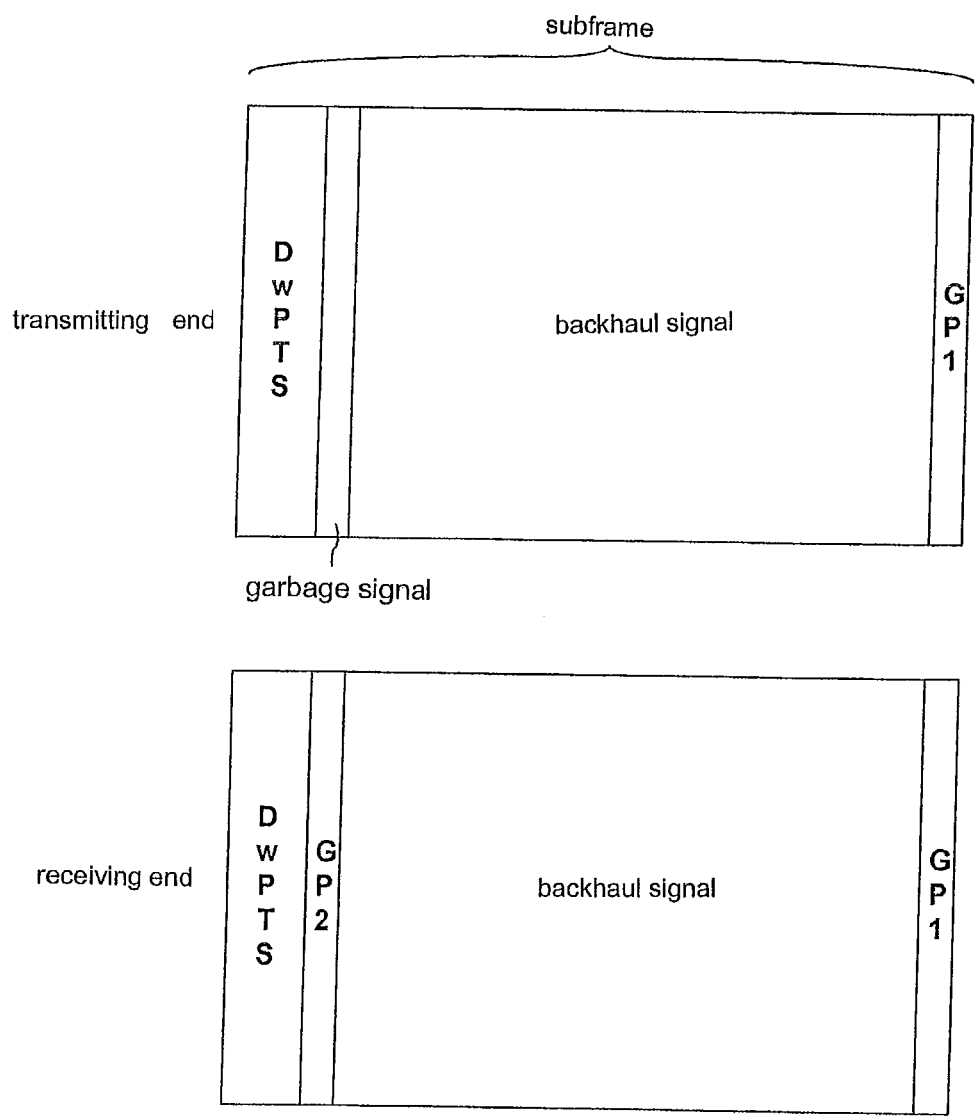
FIG. 7 is a view illustrating a signal structure of a special subframe used to transmit/receive data in a relay communication system according to still another embodiment of the present invention.

FIG. 7 is a view illustrating a signal structure of a special subframe used to transmit/receive data in a relay communication system according to still another embodiment of the present invention.

First of all, the transmitting end transmits a DL signal to the terminals at the DwPTS. Then, the transmitting end transmits a garbage signal for a predetermined time so that the receiving end can perform a mode conversion between a transmission mode and a reception mode. Then, the transmitting end transmits a backhaul signal to the receiving end until it reaches the GP1. Referring to FIG. 7, the garbage signal period, the backhaul signal period and the GP1 correspond to the GP and the UpPTS in a configuration of the special subframe.

In one embodiment of FIG. 3, the receiving end continues to receive a backhaul signal until the UpPTS starts to be implemented. On the other hand, in still another embodiment of FIG. 7, the receiving end may continue to receive a backhaul signal until a UL subframe starts to be implemented, by preventing the terminals from performing UL transmission at the UpPTS.

In a process for setting a special subframe which can be identified by the terminals through a PBCH (physical broadcast channel), etc., even if the UpPTS is set to have a length rather than '0', transmission by the terminals within the UpPTS may be prohibited by a random access setting. Accordingly, backhaul data may be transmitted at the UpPTS. More concretely, the UpPTS implemented when setting the special subframe is a nominal period, and a substantial UpPTS where the terminals can transmit a UL signal may be '0'.

The transmitting end may be operated according to one embodiment of FIG. 3, and the receiving end may be operated according to the third embodiment of FIG. 7. In this case, the GP1 at the transmitting end side may be used as the UpPTS at the receiving end side.

Figure 8:
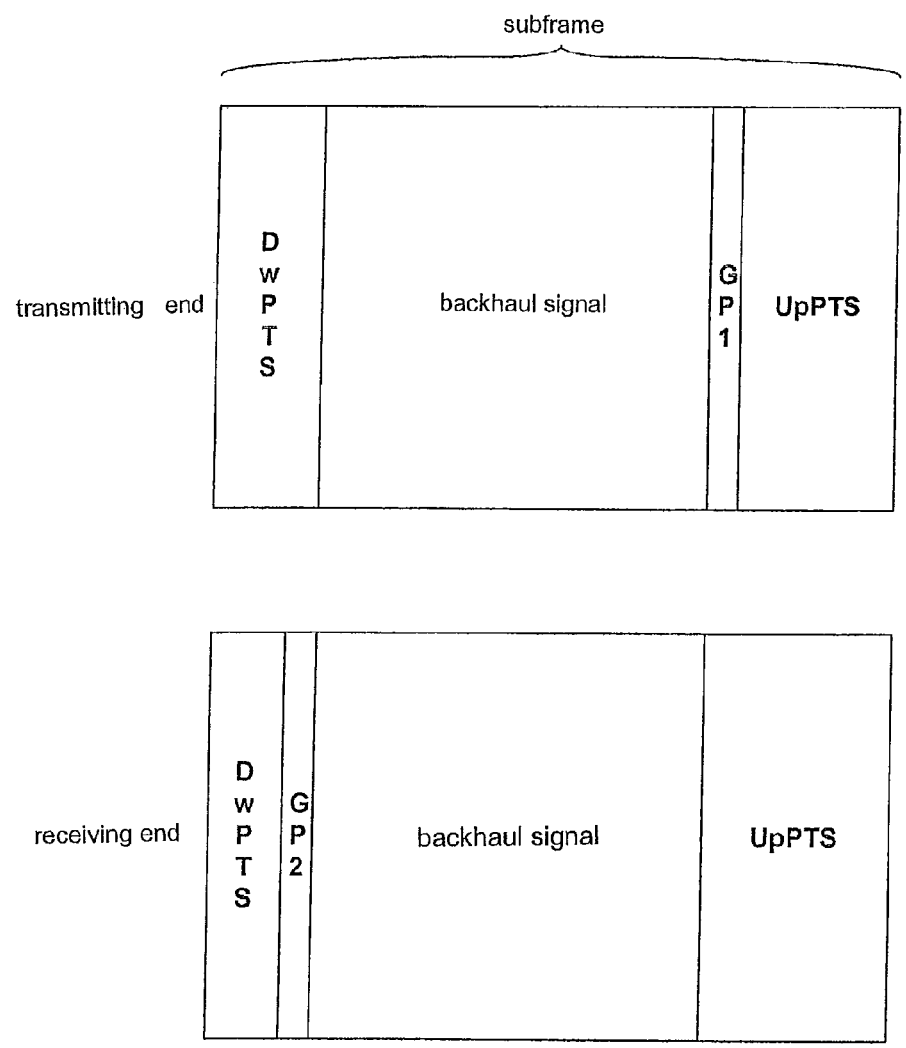
FIG. 8 is a view illustrating a signal structure of a special subframe used to transmit/receive data in a relay communication system according to still another embodiment of the present invention.

FIG. 8 is a view illustrating a signal structure of a special subframe used to transmit/receive data in a relay communication system according to still another embodiment of the present invention.

One embodiment of FIG. 3 may be compared with still another embodiment of FIG. 8 as follows. Once the receiving end has completed a mode conversion before a backhaul signal is transmitted, a length of DwPTS at the receiving end side is set to be shorter than that of DwPTS at the transmitting end side. Under this configuration, a garbage signal period may be omitted.

Figure 9:
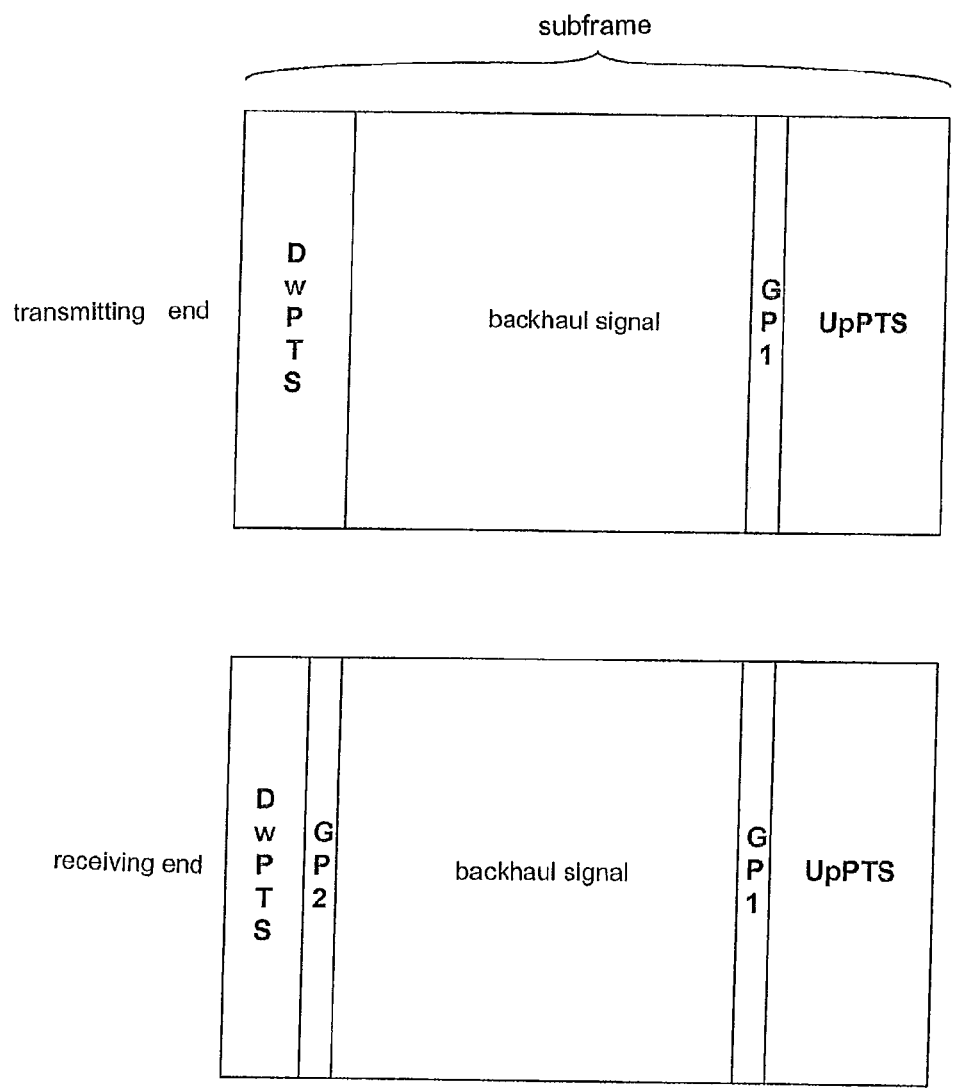
FIG. 9 is a view illustrating a signal structure of a special subframe used to transmit/receive data in a relay communication system according to still another embodiment of the present invention.

FIG. 9 is a view illustrating a signal structure of a special subframe used to transmit/receive data in a relay communication system according to still another embodiment of the present invention.

Still another embodiment of FIG. 8 may be compared with still another embodiment of FIG. 9 as follows. In still another embodiment of FIG. 8, while the transmitting end prepares for reception of a UL signal from the terminals at the GP1, the receiving end receives a UL signal from the terminals. On the other hand, in still another embodiment of FIG. 9, the receiving end prepares for reception of a UL signal from the terminals at the GP1 like the transmitting end.

More concretely, in still another embodiment of FIG. 8, upon receipt of a backhaul signal, the receiving end receives a UL signal from the terminals. On the other hand, in still another embodiment of FIG. 9, the receiving end receives a backhaul signal, and then receives a UL signal from the terminals via a guard period of a predetermined time. Preferably, whether to receive a UL signal immediately or after a predetermined time may be determined by the receiving end with consideration of a communication statue, environments, etc.

The transmitting end and the receiving end may select one of possible configurations of a special subframe for transmission of backhaul data, thereby defining a position and a length of a subframe where a backhaul signal is transmitted. Especially, the transmitting end and the receiving end may use different configurations of a special subframe for transmission of backhaul data. Hereinafter, with reference to FIGS. 10 and 11, will be explained an embodiment where the transmitting end and the receiving end use different configurations of a special subframe for transmission of backhaul data.

Figure 10:
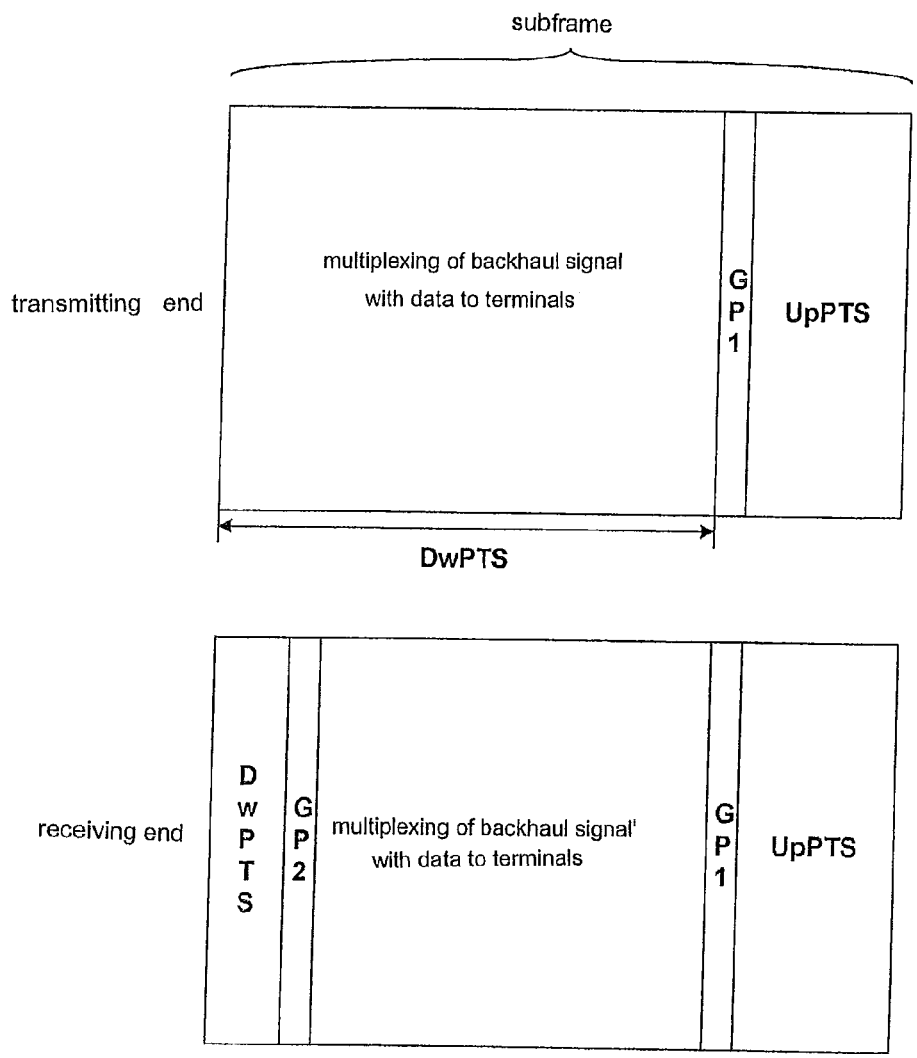
FIGS. 10 and 11 are views illustrating a signal structure of a special subframe used to transmit/receive data in a relay communication system according to still another embodiment of the present invention.
Figure 11:
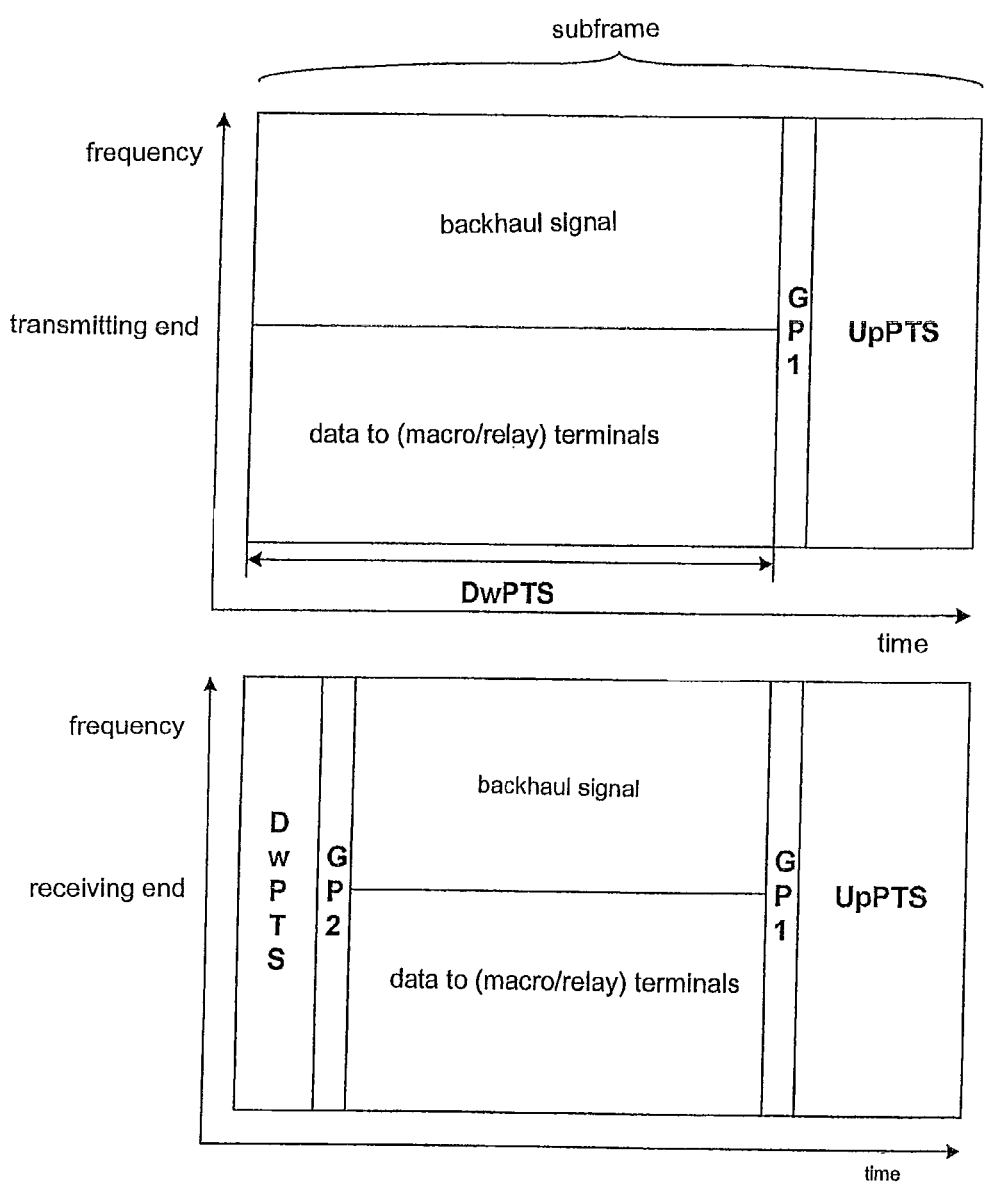

FIGS. 10 and 11 are views illustrating a signal structure of a special subframe used to transmit/receive data in a relay communication system according to still another embodiment of the present invention.

As shown in FIG. 10, the transmitting end may use a configuration of a special subframe having a long length of DwPTS (e.g., configuration 4 of a special subframe), and the receiving end may use a configuration of a special subframe having a long length of GP (e.g., configuration 0 of a special subframe). Here, the transmitting end may transmit a backhaul signal together with UE data by setting the long DwPTS as a backhaul signal period, and the receiving end may receive a backhaul signal by setting the long GP as a backhaul signal period. Alternatively, the receiving end may set UpPTS as a backhaul signal period. In FIG. 10, the GP of the receiving end side includes GP1, GP2 and a backhaul signal period.

In the case that the transmitting end and the receiving end have different configurations of a special subframe, e.g., in configuration 0 where the number of UL subframes is larger than the number of DL subframes, the base station may correspond to the transmitting end and the relay node may correspond to the receiving end. Alternatively, in configuration 5 where the number of DL subframes is larger than the number of UL subframes, the relay node may correspond to the transmitting end and the base station may correspond to the receiving end.

According to the embodiment of FIG. 10, the transmitting end may multiplex a data signal and a backhaul signal to be transmitted to the terminals directly connected thereto. For instance, as shown in FIG. 11, the transmitting end may transmit a data signal and a backhaul signal to the terminals through FDM (frequency division multiplexing).

Figure 12:
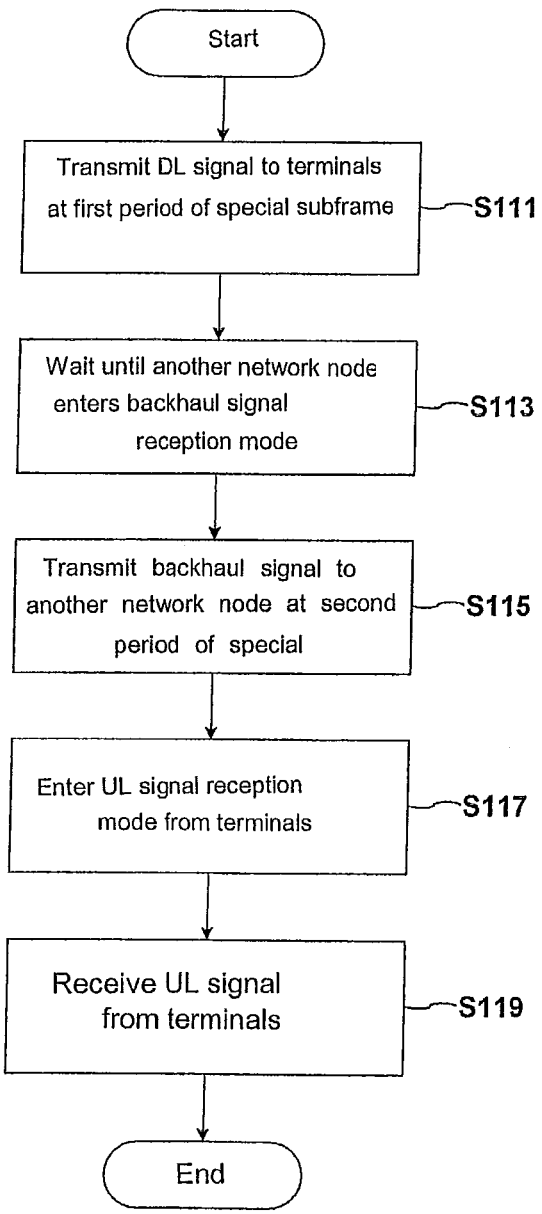
FIG. 12 is a flowchart to explain a method for transmitting/receiving data at a transmitting end in a relay communication system according to one embodiment of the present invention.

FIG. 12 is a flowchart to explain a method for transmitting/receiving data at a transmitting end in a relay communication system according to one embodiment of the present invention. Here, the transmitting end is a base station in case of a DL backhaul, and is a relay node in case of a UL backhaul. Hereinafter, for convenience, it is assumed that the transmitting end is a base station and a receiving end is a relay node.

First of all, the base station transmits a DL signal to macro UEs at a first period (e.g., DwPTS) of a special subframe (S111). Then, the base station may be in a standby state until the relay node enters a backhaul signal reception mode (S113). During the standby state, the base station may output a garbage signal. Then, the base station transmits a backhaul signal to the relay node at a second period (e.g., backhaul signal transmission period) of the special subframe (S115). Then, the base station may enter a UL signal reception mode from the terminals (S117). Then, the base station may receive a UL signal from the macro UEs at a UL signal reception period from the terminals (e.g., UpPTS or the next UL subframe) (S119).

Figure 13:
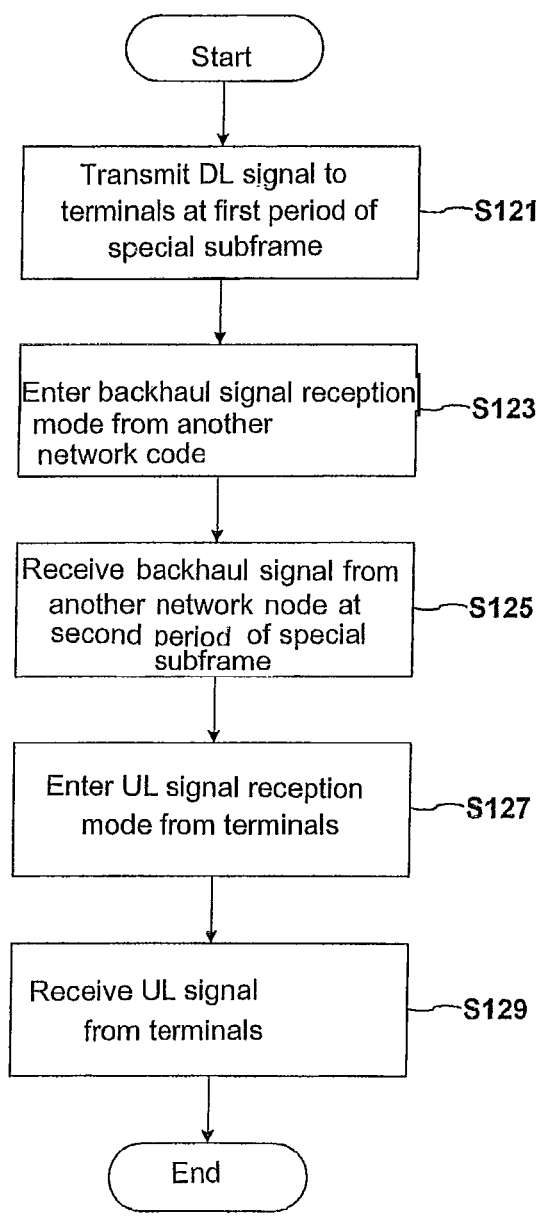
FIG. 13 is a flowchart to explain a method for transmitting/receiving data at a receiving end in a relay communication system according to one embodiment of the present invention.

FIG. 13 is a flowchart to explain a method for transmitting/receiving data at a receiving end in a relay communication system according to one embodiment of the present invention. Here, the receiving end is a relay node in case of a DL backhaul, and is a base station in case of a UL backhaul. Hereinafter, for convenience, it is assumed that a transmitting end is a base station and the receiving end is a relay node.

First of all, the relay node transmits a DL signal to relay UEs at a first period (e.g., DwPTS) of a special subframe (S121). Then, the relay node performs a mode conversion from a transmission mode to a reception mode, thereby entering a backhaul signal reception mode from the base station (S123). Then, the relay node receives a backhaul signal from the base station at a second period (e.g., backhaul signal transmission period) of the special subframe (S125). Then, the relay node may enter a UL signal reception mode from the terminals (S127). Then, the relay node may receive a UL signal from the relay UEs, at a UL signal reception period from the terminals (e.g., UpPTS or the next UL subframe) (S129).

Figure 14:
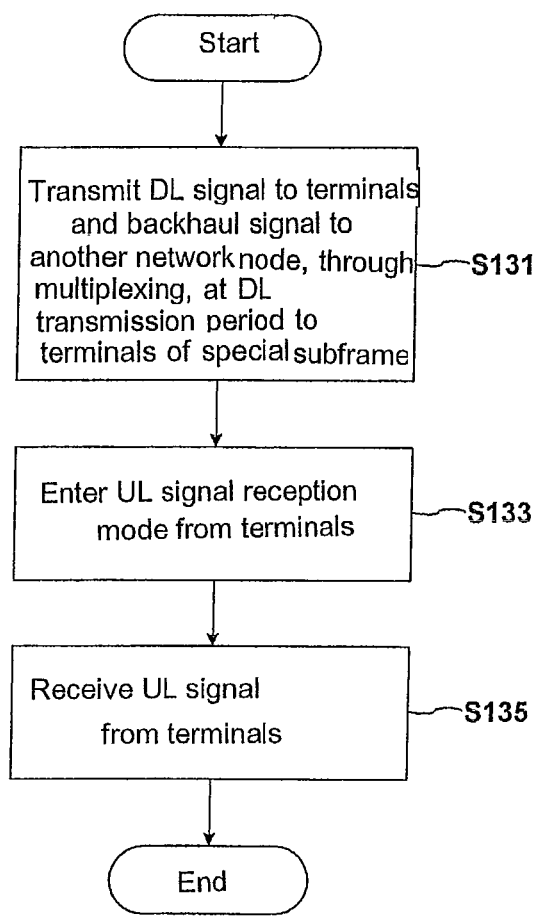
FIG. 14 is a flowchart to explain a method for transmitting/receiving data at a transmitting end in a relay communication system according to another embodiment of the present invention.

FIG. 14 is a flowchart to explain a method for transmitting/receiving data at a transmitting end in a relay communication system according to another embodiment of the present invention. Here, the transmitting end is a base station in case of a DL backhaul, and is a relay node in case of a UL backhaul. Hereinafter, for convenience, it is assumed that the transmitting end is a base station and a receiving end is a relay node.

First of all, the base station transmits a DL signal to the macro UEs and a backhaul signal to the relay node at a first period (e.g., DwPTS) of a special subframe, through multiplexing (e.g., frequency division multiplexing) (S131). Then, the base station may enter a UL signal reception mode from the terminals (S133). Then, the base station may receive a UL signal from the macro UEs, at a UL signal reception period from the terminals (e.g., UpPTS or the next UL subframe) (S135).

Figure 15:
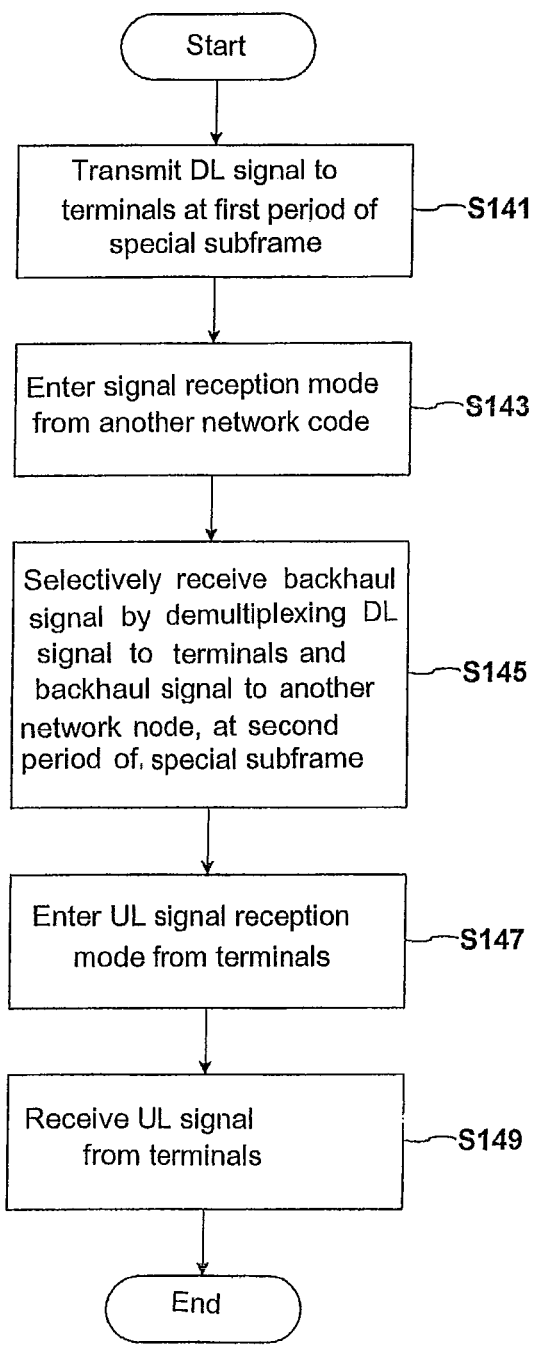
FIG. 15 is a flowchart to explain a method for transmitting/receiving data at a receiving end in a relay communication system according to another embodiment of the present invention.

FIG. 15 is a flowchart to explain a method for transmitting/receiving data at a receiving end in a relay communication system according to another embodiment of the present invention. Here, the receiving end is a relay node in case of a DL backhaul, and is a base station in case of a UL backhaul. Hereinafter, for convenience, it is assumed that a transmitting end is a base station and the receiving end is a relay node.

First of all, the relay node transmits a DL signal to relay UEs at a first period (e.g., DwPTS) of a special subframe (S141). Then, the relay node performs a mode conversion from a transmission mode to a reception mode, thereby entering a backhaul signal reception mode from the base station (S143). Then, the relay node selectively receives a backhaul signal by demultiplexing a multiplexed signal (e.g., signal having undergone FDM) at a second period (e.g., backhaul signal transmission period) of the special subframe (S145). Here, the multiplexed signal indicates multiplexing of a DL signal transmitted to the macro UEs from the base station, with a backhaul signal transmitted to the relay node from the base station. Then, the relay node may enter a UL signal reception mode from the terminals (UEs) (S147). Then, the relay node may receive a UL signal from the relay UEs, at a UL signal reception period from the terminals (e.g., UpPTS or the next UL subframe) (S149).

Figure 16:
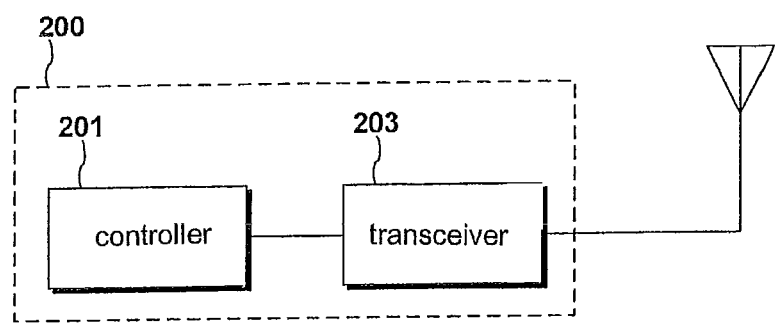
FIG. 16 is a block diagram of an apparatus for transmitting/receiving data in a relay communication system according to one embodiment of the present invention.

FIG. 16 is a block diagram of an apparatus for transmitting/receiving data in a relay communication system according to one embodiment of the present invention.

The apparatus for transmitting/receiving data according to one embodiment of the present invention 200 comprises a controller 201 and a transceiver 203. The apparatus for transmitting/receiving data according to one embodiment of the present invention 200 may be a base station or a relay node. Hereinafter, for convenience, it is assumed that the apparatus for transmitting/receiving data according to one embodiment of the present invention 200 is a base station.

The controller 201 transmits a control signal for controlling the entire operation of the transceiver 203.

The controller 201 may set a data frame including a downlink subframe for transmitting a downlink (DL) signal, an uplink subframe for transmitting an uplink signal, and a special subframe placed between the downlink subframe and the uplink subframe. Furthermore, the controller 201 may share the set data frame with another network node (base station or relay node) via the transceiver 203.

The transceiver 203 may transmit a DL signal to the macro UE at a first period (e.g., DwPTS) of a special subframe. And, the transceiver 203 may be in a standby state until the relay node enters a backhaul signal reception mode. During the standby state, the transceiver 203 may output a garbage signal.

The transceiver 203 transmits a backhaul signal to the relay node at a second period (e.g., backhaul signal transmission period) of the special subframe. Then, the transceiver 203 may enter a UL signal reception mode from the terminals. Then, the transceiver 203 may receive a UL signal from the terminals, at a UL signal reception period from the terminals (e.g., UpPTS or the next UL subframe).

Alternatively, the transceiver 203 may transmit a DL signal to the macro UE and a backhaul signal to the relay node at a first period (e.g., DwPTS) of a special subframe, through multiplexing (e.g., frequency division multiplexing). Then, the transceiver 203 may enter a UL signal reception mode from the terminals. The transceiver 203 may receive a UL signal from the terminals, at a UL signal reception period from the terminals (e.g., UpPTS or the next UL subframe).

Explanations about the controller 201 and the transceiver 203 of the apparatus 200 implemented as the relay node will be omitted, since they are similar to those aforementioned with reference to FIGS. 12 to 15.

The apparatus for transmitting/receiving data according to one embodiment of the present invention may comprise hardware, software and a recording medium, such as an output device (display device, speaker, etc.), an input device (touch screen, keypad, microphone, etc.), a memory and a processor. This is obvious to those skilled in the art, and thus detailed explanations thereof will be omitted.

In addition, the apparatus for transmitting/receiving data according to one embodiment of the present invention may be implemented by using, computer software, hardware, or some combination thereof. For instance, for hardware implementation, the apparatus for transmitting/receiving data according to one embodiment of the present invention may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. For software implementation, the apparatus for transmitting/receiving data according to one embodiment of the present invention may be implemented together with separate software modules that allow performing of at least one function or operation. Software codes can be implemented by a software application (or program) written in any suitable programming language. The software codes may be stored in a memory and executed by a processor. The memory or the process may be implemented as various means well-known to those skilled in the art.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for transmitting data by a base station in a wireless system, the method comprising:
    transmitting a downlink signal to a relay node or a terminal by using a special subframe,
    wherein the special subframe includes a first transmission period and a second transmission period,
    wherein the first transmission period is set to transmit the downlink signal to the relay node or the terminal,
    wherein the second transmission period is set to transmit the downlink signal to the relay node and is set to not decode a reference signal by the terminal, wherein special subframe configurations for a transmitting end and a receiving end are different from each other, and wherein the transmitting end and the receiving end are determined based on the number of downlink subframes and uplink subframes, and the base station is set to the transmitting end when the number of uplink subframes is larger than the number of downlink subframes, and the base station is set to the receiving end when the number of downlink subframes is larger than the number of uplink subframes.

2. The method of claim 1, wherein the special subframe further includes a guard period between the first transmission period and the second transmission period, and a garbage signal is transmitted to the relay node or the terminal during the guard period.

3. The method of claim 1, further comprising:
entering an uplink signal reception mode to receive an uplink signal from the relay node or the terminal, after transmitting the downlink signal to the relay node via the second transmission period.

4. A method for transceiving data by a relay node in a wireless system, the method comprising:
transceiving a downlink signal to a base station or a terminal by using a special subframe,
wherein the special subframe includes a first transmission period and a second transmission period,
wherein the first transmission period is set to transmit the downlink signal to the terminal,
wherein the second transmission period is set to receive the downlink signal from the base station and is set to not decode a reference signal by the terminal,
wherein special subframe configurations for a transmitting end and a receiving end are different from each other, and
wherein the transmitting end and the receiving end are determined based on the number of downlink subframes and uplink subframes, and the relay node is set to the receiving end when the number of uplink subframes is larger than the number of downlink subframes, and the relay node is set to the transmitting end when the number of downlink subframes is larger than the number of uplink subframes.

5. The method of claim 4, wherein the special subframe further includes a guard period between the first transmission period and the second transmission period, and a mode conversion from a transmission mode to a reception mode is executed during the guard period.

6. The method of claim 4, further comprising:
entering an uplink signal reception mode to receive an uplink signal from the terminal, after receiving the downlink signal from the base station via the second transmission period.

7. A method for transmitting data by a base station in a wireless system, the method comprising:
transmitting a downlink signal to a relay node or a terminal by using a special subframe,
wherein at least one transmission period of the special subframe is set to transmit the downlink signal, through multiplexing, to the relay node and the terminal, and
wherein the at least one transmission period is set to not decode a reference signal by the terminal,
wherein special subframe configurations for a transmitting end and a receiving end are different from each other, and
wherein the transmitting end and the receiving end are determined based on the number of downlink subframes and uplink subframes, and the base station is set to the transmitting end when the number of uplink subframes is larger than the number of downlink subframes, and the base station is set to the receiving end when the number of downlink subframes is larger than the number of uplink subframes.

8. The method of claim 7, further comprising:
entering an uplink signal reception mode to receive an uplink signal from the relay node or the terminal, after transmitting the downlink signal, through multiplexing, to the relay node and the terminal.

9. A method for transceiving data by a relay node in a wireless system, the method comprising:
transceiving a downlink signal to a base station or a first terminal by using a special subframe,
wherein the special subframe includes a first transmission period and a second transmission period,
wherein the first transmission period is set to transmit the downlink signal to the first terminal,
wherein the second transmission period is set to receive the downlink signal by the first terminal from the base station and is set to receive the downlink signal multiplexed by a second terminal from the base station,
wherein at least one transmission period of the special subframe is set to not decode a reference signal by the first and second terminals,
wherein special subframe configurations for a transmitting end and a receiving end are different from each other, and
wherein the transmitting end and the receiving end are determined based on the number of downlink subframes and uplink subframes, and the base station is set to the transmitting end when the number of uplink subframes is larger than the number of downlink subframes, and the base station is set to the receiving end when the number of downlink subframes is larger than the number of uplink subframes.

10. The method of claim 9, further comprising:
entering an uplink signal reception mode to receive an uplink signal from the first terminal, after the downlink signal is transmitted to the first terminal from the base station and after the downlink signal is transmitted to the second terminal from the base station through multiplexing.

11. A method for transmitting data in a wireless system, the method comprising:
transmitting a downlink signal, by a base station, to a relay node by using a special subframe; and
transmitting the downlink signal, by the relay node, to the base station or a second terminal by using the special subframe,
wherein the special subframe includes a first transmission period and a second transmission period,
wherein the first transmission period is set to transmit the downlink signal from the base station to the relay node or a first terminal or the second terminal,
wherein the second transmission period is set to transmit the downlink signal from the base station to the relay node,
wherein the second transmission period is set to not decode a reference signal by the first and second terminals,
wherein special subframe configurations for a transmitting end and a receiving end are different from each other, and
wherein the transmitting end and the receiving end are determined based on the number of downlink subframes and uplink subframes, and the base station is set to the transmitting end when the number of uplink subframes is larger than the number of downlink subframes, and the base station is set to the receiving end when the number of downlink subframes is larger than the number of uplink subframes.

12. The method of claim 11, wherein the first transmission and the second transmission period from a perspective of the base station do not match the first transmission and the second transmission period from a perspective of the relay node.

13. The method of claim 11, wherein the first transmission period corresponds to a Downlink Pilot Time Slot from a perspective of the first and second terminals, and the second transmission period corresponds to at least part of a guard period from a perspective of the first and second terminals.

14. An apparatus for transmitting/receiving data, the apparatus comprising:
    a radio frequency unit (RF unit); and
    a processor,
    wherein the processor is configured to transmit a downlink signal to a relay node or a terminal by using a special subframe,
    wherein the special subframe includes a first and a second transmission periods,
    wherein the first transmission period is set to transmit the downlink signal to the relay node or the terminal, and
    wherein the second transmission period is set to transmit the downlink signal to the relay node and is set to not decode a reference signal by the terminal,
    wherein special subframe configurations for a transmitting end and a receiving end are different from each other, and
    wherein the transmitting end and the receiving end are determined based on the number of downlink subframes and uplink subframes, and the relay node is set to the receiving end when the number of uplink subframes is larger than the number of downlink subframes, and the relay node is set to the transmitting end when the number of downlink subframes is larger than the number of uplink subframes.

15. An apparatus for transmitting/receiving data, the apparatus comprising:
    a radio frequency unit (RF unit); and
    a processor,
    wherein the processor is configured to transceive a downlink signal to a base station or a terminal by using a special subframe,
    wherein the special subframe includes a first transmission period and a second transmission period,
    wherein the first transmission period is set to transmit the downlink signal to the terminal, and
    wherein the second transmission period is set to receive the downlink signal from the base station and is set to not decode a reference signal by the terminal,
    wherein special subframe configurations for a transmitting end and a receiving end are different from each other, and
    wherein the transmitting end and the receiving end are determined based on the number of downlink subframes and uplink subframes, and the base station is set to the transmitting end when the number of uplink subframes is larger than the number of downlink subframes, and the base station is set to the receiving end when the number of downlink subframes is larger than the number of uplink subframes.

* * * * *